United States Patent
Fang et al.

(10) Patent No.: US 9,788,222 B2
(45) Date of Patent: Oct. 10, 2017

(54) NETWORK, AND NETWORK ESTABLISHING METHOD AND DEVICE

(71) Applicant: Huawei Technologies Co., Ltd., Shenzhen, Guangdong (CN)

(72) Inventors: Wenyi Fang, Hangzhou (CN); Li Xue, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 14/832,165

(22) Filed: Aug. 21, 2015

(65) Prior Publication Data

US 2016/0036540 A1 Feb. 4, 2016

Related U.S. Application Data

(63) Continuation of application No. PCT/CN2015/072483, filed on Feb. 9, 2015.

(30) Foreign Application Priority Data

Jul. 30, 2014 (CN) .......................... 2014 1 0371272

(51) Int. Cl.
| | |
|---|---|
| *H04L 1/00* | (2006.01) |
| *H04W 24/08* | (2009.01) |
| *H04W 8/00* | (2009.01) |
| *H04W 84/20* | (2009.01) |
| *H04W 84/12* | (2009.01) |

(52) U.S. Cl.
CPC ........... *H04W 24/08* (2013.01); *H04W 8/005* (2013.01); *H04W 84/20* (2013.01); *H04W 84/12* (2013.01)

(58) Field of Classification Search
CPC ......... H04L 12/5695; H04L 2012/5631; H04L 29/08171; H04L 41/5054; H04L 47/788; H04L 47/822; H04L 47/823; H04L 63/10; H04L 67/10; H04L 67/1002; H04L 67/101; H04L 67/1012; H04L 67/1029; H04L 67/1078; H04L 67/28

USPC ........ 370/252, 352, 389, 412, 466; 709/226, 709/238, 244, 102, 105

See application file for complete search history.

(56) References Cited

U.S. PATENT DOCUMENTS

| | | |
|---|---|---|
| 2005/0086273 A1 | 4/2005 | Loebbert et al. |
| 2012/0224569 A1 | 9/2012 | Kubota |
| 2014/0181201 A1 | 6/2014 | Choi |

FOREIGN PATENT DOCUMENTS

| | | |
|---|---|---|
| CN | 1602606 A | 3/2005 |
| CN | 101471829 A | 7/2009 |
| CN | 101867963 A | 10/2010 |
| CN | 102684753 A | 9/2012 |
| CN | 102685856 A | 9/2012 |

(Continued)

*Primary Examiner* — Dady Chery

(57) ABSTRACT

Embodiments of the present invention provide a network establishing method. The method includes: acquiring a first comparison result obtained by comparing a comprehensive performance value of a first device with a comprehensive performance value of a second device, where the performance value of the first device respectively indicate one or more aspects of a data exchange capability of the first device, and the performance value of the second device respectively indicate one or more aspects of a data exchange capability of the second device; and setting the first device as a group server or a group client of a primary network according to the first comparison result, where the primary network includes the first device and the second device.

31 Claims, 13 Drawing Sheets

(56) References Cited

FOREIGN PATENT DOCUMENTS

| | | |
|---|---|---|
| CN | 103178877 A | 6/2013 |
| CN | 103687058 A | 3/2014 |
| CN | 104113941 A | 10/2014 |
| EP | 2 712 264 A1 | 3/2014 |
| EP | 2 768 269 A1 | 8/2014 |
| KR | 20120046547 A | 5/2012 |
| KR | 20140036958 A | 3/2014 |
| KR | 1020140089622 A | 7/2014 |
| WO | WO 2015/132813 A1 | 9/2015 |

NETWORK, AND NETWORK ESTABLISHING METHOD AND DEVICE

CROSS-REFERENCE TO RELATED APPLICATIONS

This application is a continuation of International Application No. PCT/CN2015/072483, filed on Feb. 9, 2015, which claims priority to Chinese Patent Application No. 201410371272.2, filed on Jul. 30, 2014, both of which are hereby incorporated by reference in their entireties.

TECHNICAL FIELD

The present invention relates to the network field, and in particular, to a network, and a network establishing method and device.

BACKGROUND

Devices that support WIFI Direct (wireless fidelity direct, a wireless fidelity direct technology) can implement wireless connection to each other and network establishing without requiring an access point or a router. In a network, one device is used as a group server, and other devices are used as group clients. The group server is a master node in the network. When the group clients exchange data, one group client first sends the data to the group server, and the group server then sends the data to another group client. Therefore, a data exchange capability of the device used as the group server is essentially important.

In the prior art, when a network is established, devices compare their group server intention values. A device whose group server intention value is relatively large becomes a group server, and a device whose group server intention value is relatively small becomes a group client. However, the group server intention value is generally a default value, and a device that is determined as the group server according to the group server intention value is not necessarily a device having the strongest data exchange capability among devices that establish the network. In addition, after network establishing is complete, if another device needs to be added to the network, the another device can become only a group client of the network regardless of a data exchange capability of the another device. That is, even if the data exchange capability of the another device is relatively strong, the another device cannot become the group server of the network. Therefore, when an amount of data exchanged in the network is relatively large, and if a data exchange capability of the device used as the group server is relatively weak, a data exchange capability of an entire network is still restricted by the relatively weak data exchange capability of the group server even if the network includes a device having a stronger data exchange capability, and therefore, the device having a stronger data exchange capability is not fully used.

The present invention seeks to resolve the foregoing problem.

SUMMARY

Embodiments of the present invention provide a network, and a network establishing method and device, so that a device used as a group server of a network has a strongest data exchange capability among devices in the network. During data exchange, the device having the strongest data exchange capability can be fully used, thereby enhancing a data exchange capability of the network.

According to a first aspect, an embodiment of the present invention provides a network establishing method, including:

acquiring a first comparison result obtained by comparing a comprehensive performance value of a first device with a comprehensive performance value of a second device, where the comprehensive performance value of the first device is obtained by means of calculation according to a performance value of the first device, and the comprehensive performance value of the second device is obtained by means of calculation according to a performance value of the second device, where the performance value of the first device respectively indicate one or more aspects of a data exchange capability of the first device, and the performance value of the second device respectively indicate one or more aspects of a data exchange capability of the second device; and setting the first device as a group server or a group client of a primary network according to the first comparison result, where the primary network includes the first device and the second device.

In a first possible implementation manner of the first aspect, the acquiring a first comparison result obtained by comparing a comprehensive performance value of a first device with a comprehensive performance value of a second device includes:

receiving the performance value of the second device;

calculating the comprehensive performance value of the first device according to the performance value of the first device, and calculating the comprehensive performance value of the second device according to the received a performance value of the second device; and comparing the comprehensive performance value of the first device with the comprehensive performance value of the second device, to obtain the first comparison result.

In a second possible implementation manner of the first aspect, the acquiring a first comparison result obtained by comparing a comprehensive performance value of a device with a comprehensive performance value of a second device includes:

sending the performance value of the first device to the second device;

receiving the comprehensive performance value of the first device and the comprehensive performance value of the second device, where the comprehensive performance value of the first device is obtained by the second device by means of calculation according to the performance value of the first device that is sent by the first device, and the comprehensive performance value of the second device is obtained by the second device by means of calculation according to the performance value of the second device; and comparing the received comprehensive performance value of the first device with the received comprehensive performance value of the second device, to obtain the first comparison result.

In a third possible implementation manner of the first aspect, the acquiring a first comparison result obtained by comparing a comprehensive performance value of a first device with a comprehensive performance value of a second device includes:

calculating the comprehensive performance value of the first device according to the performance value of the first device;

receiving the comprehensive performance value of the second device; and comparing the comprehensive performance value of the first device with the comprehensive performance value of the second device, to obtain the first comparison result.

In a fourth possible implementation manner of the first aspect, the acquiring a first comparison result obtained by comparing a comprehensive performance value of a first device with a comprehensive performance value of a second device includes:

sending the performance value of the first device to the second device; and receiving the first comparison result, where the first comparison result is obtained by the second device by comparing the comprehensive performance value of the first device with the comprehensive performance value of the second device, where the comprehensive performance value of the first device is obtained by the second device by means of calculation according to the performance value of the first device that is sent by the first device, and the comprehensive performance value of the second device is obtained by the second device by means of calculation according to the performance value of the second device.

With reference to the first aspect or any one of the first to the fourth possible implementation manners of the first aspect, in a fifth possible implementation manner, the method further includes:

setting the first device as an initial group server or an initial group client of the primary network according to an initial value of a group server intention value of the first device and an initial value of a group server intention value of the second device, where the initial value of the group server intention value of the first device and the initial value of the group server intention value of the second device are preset; and if the first device is set as the initial group server of the primary network, the acquiring a first comparison result obtained by comparing a comprehensive performance value of a first device with a comprehensive performance value of a second device includes: receiving, by the first device, the performance value of the second device that is sent by the second device; acquiring, by the first device by means of calculation according to the performance value of the first device, the comprehensive performance value of the first device; and acquiring, by the first device by means of calculation according to the received a performance value of the second device, the comprehensive performance value of the second device.

With reference to the first aspect or any one of the first to the fifth possible implementation manners of the first aspect, in a sixth possible implementation manner, if the first device is set as the group server of the primary network, the method further includes:

acquiring a second comparison result obtained by comparing the comprehensive performance value of the first device with a comprehensive performance value of a third device, where the comprehensive performance value of the third device is obtained by means of calculation according to a performance value of the third device, and the performance value of the third device respectively indicate one or more aspects of a data exchange capability of the third device; and setting the first device as a group server or a group client of a secondary network according to the second comparison result, where the secondary network includes the first device, the second device, and the third device.

With reference to the sixth possible implementation manner of the first aspect, in a seventh possible implementation manner, the acquiring a second comparison result obtained by comparing the comprehensive performance value of the first device with a comprehensive performance value of a third device includes:

receiving the performance value of the third device;

calculating the comprehensive performance value of the third device according to the received performance value of the third device; and comparing the comprehensive performance value of the first device with the comprehensive performance value of the third device, to obtain the second comparison result.

With reference to either possible implementation manner of the sixth possible implementation manner and the seventh possible implementation manner of the first aspect, in an eighth possible implementation manner, if the third device is set as the group server of the secondary network after the first device is set as the group client of the primary network and the second device is set as the group server of the primary network, and if the first device receives an invite request signal sent by the third device, the first device returns an invite response signal to the third device, where the invite response signal notifies the third device that the first device becomes the group client of the secondary network.

With reference to the first aspect or any one of the first to the fourth possible implementation manners of the first aspect, in a ninth possible implementation manner, before the acquiring a first comparison result obtained by comparing a comprehensive performance value of a device with a comprehensive performance value of a second device, according to the comprehensive performance value of the second device and a comprehensive performance value of a third device, the second device is set as a group server of an initial network, and the third device is set as a group client of the initial network, where the initial network includes the second device and the third device, the comprehensive performance value of the third device is obtained by means of calculation according to a performance value of the third device, and the performance value of the third device respectively indicate one or more aspects of a data exchange capability of the third device; and if the first device is set as the group server of the primary network, the first device sends an invite signal to the third device, and receives a response signal that is sent by the third device and specific to the invite signal, where the response signal notifies the first device that the third device is changed to a group client of the primary network.

With reference to the first aspect or any one of the first to the ninth possible implementation manners of the first aspect, in a tenth possible implementation manner, the setting the first device as a group server or a group client of a primary network according to the first comparison result includes:

setting the group server intention value of the first device according to the first comparison result;

receiving the group server intention value of the second device, where the group server intention value of the second device is determined by the second device according to the first comparison result; and setting the first device as the group server or the group client of the primary, network according to the group server intention value of the first device and the group server intention value of the second device.

With reference to the tenth possible implementation manner of the first aspect, in an eleventh possible implementation manner, the setting the first device as a group server or a group client of a primary network according to the first comparison result further includes: sending the first comparison result to the second device.

With reference to the first aspect or any one of the first to the eleventh possible implementation manners of the first aspect, in a twelfth possible implementation manner, that the comprehensive performance value of the first device is obtained by means of calculation according to a performance value of the first device, and the comprehensive performance value of the second device is obtained by means of calculation according to a performance value of the second device includes:

acquiring the comprehensive performance value of the first device by performing, according to several coefficients and by using a weighting method, weighting calculation on the several performance values of the first device, and acquiring the comprehensive performance value of the second device by performing, according to the several coefficients and by using the weighting method, weighting calculation on the several performance values of the second device; or enabling one performance value of the first device to be the comprehensive performance value of the first device, and enabling one performance value of the second device to be the comprehensive performance value of the second device.

With reference to the twelfth possible implementation manner of the first aspect, in a thirteenth possible implementation manner, the several coefficients are in a one-to-one correspondence with the several performance values of the first device, and are also in a one-to-one correspondence with the several performance values of the second device, where the acquiring the comprehensive performance value of the first device by performing, according to several coefficients and by using a weighting method, weighting calculation on the several performance values of the first device includes: multiplying, on one-to-one basis, coefficients in the several coefficients by corresponding performance values in the several performance values of the first device, to obtain several multiplication results of the first device, and performing summation on the several multiplication results of the first device, to obtain the comprehensive performance value of the first device; and the acquiring the comprehensive performance value of the second device by performing, according to the several coefficients and by using the weighting method, weighting calculation on the several performance values of the second device includes: multiplying, on one-to-one basis, coefficients in the several coefficients by corresponding performance values in the several performance values of the second device, to obtain several multiplication results of the second device, and performing summation on the several multiplication results of the second device, to obtain the comprehensive performance value of the second device.

With reference to either the twelfth or the thirteenth possible implementation manner of the first aspect, in a fourteenth possible implementation manner, the several coefficients are obtained by means of calculation by using an analytic hierarchy process.

With reference to the first aspect or any one of the first to the fourteenth possible implementation manners of the first aspect, in a fifteenth possible implementation manner, both the performance value of the first device and the performance value of the second device include a dominant frequency performance value of a CPU (Central Processing Unit, central processing unit) and a WIFI (wireless fidelity, wireless network) throughput performance value.

According to a second aspect, an embodiment of the present invention provides a device, including:

an acquiring module, configured to acquire a first comparison result obtained by comparing a comprehensive performance value of the device with a comprehensive performance value of a second device, where the comprehensive performance value of the device is obtained by means of calculation according to a performance value of the device, and the comprehensive performance value of the second device is obtained by means of calculation according to a performance value of the second device, where the performance value of the device respectively indicate one or more aspects of a data exchange capability of the device, and the performance value of the second device respectively indicate one or more aspects of a data exchange capability of the second device; and a setting module, configured to set the device as a group server or a group client of a primary network according to the first comparison result, where the primary network includes the device and the second device.

In a first possible implementation manner of the second aspect, the several coefficients are obtained by means of calculation by using an analytic hierarchy process.

With reference to the second aspect or the first possible implementation manner of the second aspect, in a second possible implementation manner, both the performance value of the device and the performance value of the second device include a dominant frequency performance value of a CPU (Central Processing Unit, central processing unit) and a WIFI (wireless fidelity, wireless network) throughput performance value.

With reference to the second aspect or either possible implementation manner of the first and the second possible implementation manners of the second aspect, in a third possible implementation manner, the setting module is further configured to: before the acquiring module acquires the first comparison result, set the device as an initial group client or an initial group server of the primary network according to an initial value of a group server intention value of the device and an initial value of a group server intention value of the second device, where the initial value of the group server intention value of the device and the initial value of the group server intention value of the second device are preset.

With reference to the second aspect or either the first or the second possible implementation manners of the second aspect, in a fourth possible implementation manner, the acquiring module is further configured to acquire a second comparison result obtained by comparing the comprehensive performance value of the device with a comprehensive performance value of a third device, where the comprehensive performance value of the third device is obtained by means of calculation according to a performance value of the third device, and the performance value of the third device respectively indicate one or more aspects of a data exchange capability of the third device; and the setting module is further configured to set the device as a group server or a group client of a secondary network according to the second comparison result, where the secondary network includes the device, the second device, and the third device.

With reference to the second aspect or any one of the first to the third possible implementation manners of the second aspect, in a fifth possible implementation manner, the device further includes a responding module, configured to: after receiving an invite request signal sent by a group server of a secondary network, return an invite response signal to the group server of the secondary network, where the invite response signal notifies the group server of the secondary network that the device becomes a group client of the secondary network, and the secondary network includes the device, the second device, and the third device.

With reference to the second aspect or any one of the first to the third possible implementation manners of the second aspect, in a sixth possible implementation manner, the device further includes a determining module, where if the second device and a third device already establish an initial network before the device and the second device establish the primary network, the determining module is configured to: before the acquiring module acquires the first comparison result obtained by comparing the comprehensive performance value of the device with the comprehensive performance value of the second device, determine the second device as a group server of the initial network, where the initial network includes the second device and the third device.

With reference to the sixth possible implementation manner of the second aspect, in a seventh possible implementation manner, the device further includes an invite sending module, where if the device is set as the group server of the primary network, the invite sending module is configured to send an invite request signal to a group client of the initial network, and receive an invite response signal that is sent by the group client of the initial network and specific to the invite request signal, where the invite response signal notifies the device that the group client of the initial network is changed to a group client of the primary network.

With reference to the second aspect or any one of the first to the seventh possible implementation manners of the second aspect, in an eighth possible implementation manner, the acquiring module includes:

a receiving module, configured to receive the performance value of the second device;

a calculating module, configured to calculate the comprehensive performance value of the device and the comprehensive performance value of the second device; and a comparing module, configured to compare the comprehensive performance value of the device with the comprehensive performance value of the second device, to obtain the first comparison result.

With reference to the second aspect or any one of the first to the seventh possible implementation manners of the second aspect, in a ninth possible implementation manner, the receiving module is further configured to receive the performance value of the third device; the calculating module is further configured to calculate the comprehensive performance value of the device and the comprehensive performance value of the third device; and the comparing module is further configured to compare the comprehensive performance value of the device with the comprehensive performance value of the third device, to obtain the second comparison result.

With reference to the second aspect or any one of the first to the seventh possible implementation manners of the second aspect, in a tenth possible implementation manner, the acquiring module includes:

a sending module, configured to send the performance value of the device to the second device, so that the second device obtains the comprehensive performance value of the device by means of calculation according to the received a performance value of the device;

a receiving module, configured to receive the comprehensive performance value of the device and the comprehensive performance value of the second device, where the comprehensive performance value of the second device is obtained by the second device by means of calculation; and a comparing module, configured to compare the comprehensive performance value of the device with the comprehensive performance value of the second device, to obtain the first comparison result.

With reference to the second aspect or any one of the first to the seventh possible implementation manners of the second aspect, in an eleventh possible implementation manner, the acquiring module includes:

a calculating module, configured to calculate the comprehensive performance value of the device;

a receiving module, configured to receive the comprehensive performance value of the second device; and a comparing module, configured to compare the comprehensive performance value of the device with the comprehensive performance value of the second device, to obtain the first comparison result.

With reference to the second aspect or any one of the first to the seventh possible implementation manners of the second aspect, in a twelfth possible implementation manner, the acquiring module includes:

a sending module, configured to send the performance value of the device to the second device, so that the second device can obtain the comprehensive performance value of the device by means of calculation according to the received a performance value of the device; and a receiving module, configured to receive the first comparison result, where the first comparison result is obtained by the second device by comparing the comprehensive performance value of the device with the comprehensive performance value of the second device, and the comprehensive performance value of the second device is obtained by the second device by means of calculation.

With reference to the second aspect or any one of the first to the twelfth possible implementation manners of the second aspect, in a thirteenth possible implementation manner, the setting module includes:

an intention value setting module, configured to set the group server intention value of the device according to the first comparison result;

a receiving module, configured to receive the group server intention value of the second device, where the group server intention value of the second device is determined by the second device according to the first comparison result; and a server/client setting module, configured to set the device as the group server of the primary network or the group client of the primary network according to the group server intention value of the device and the group server intention value of the second device.

With reference to the thirteenth possible implementation manner of the second aspect, in a fourteenth possible implementation manner, the setting module further includes a sending module, configured to send the first comparison result to the second device.

According to a third aspect, an embodiment of the present invention provides a network, where the network is established by using the device in any possible implementation manner of the second aspect, and by using the method in any possible implementation manner of the first aspect.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
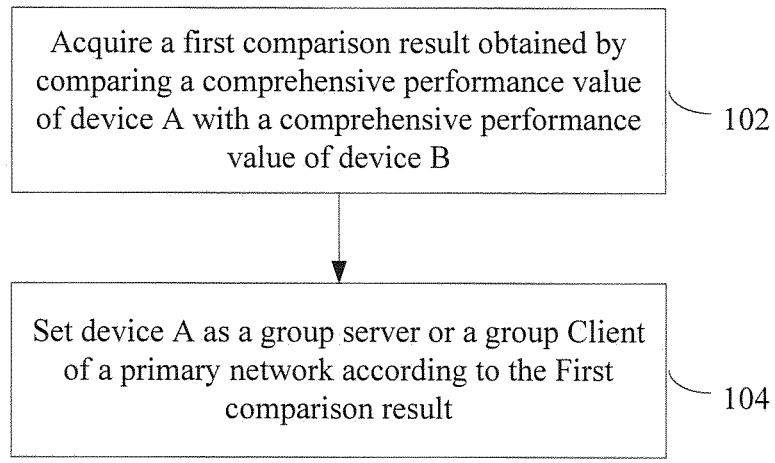
FIG. 1 is a schematic flowchart of a network establishing method according to Embodiment 1 of the present invention.

FIG. 1 is a schematic flowchart of a network establishing method according to Embodiment 1 of the present invention.

A primary network system includes a device A and a device B. "Primary" in a "primary network" in this specification, and "secondary" in a "secondary network" and "initial" in an "initial network" in the following are names of established networks, and set no limitation on features of the established networks and an establishing sequence.

A primary network establishing method includes:

In step S102, obtain a comparison result AB obtained by comparing a comprehensive performance value of the device A with a comprehensive performance value of the device B, where the comprehensive performance value of the device A is obtained by means of calculation according to a performance value of the device A, and the comprehensive performance value of the device B is obtained by means of calculation according to a performance value of the device B, where the performance value of the device A respectively indicate one or more aspects of a data exchange capability of the device A, and the performance value of the device B respectively indicate one or more aspects of a data exchange capability of the device B. In an embodiment, if the performance value of the device A/B are larger, it indicates that the one or more aspects of the data exchange capability of the device A/B are stronger; if the comprehensive performance value of device the A/B is larger, it indicates that a total data exchange capability of device A/B is stronger. In an embodiment, the several performance values of the device A are a dominant frequency performance value of a CPU (Central Processing Unit, central processing unit), a WIFI (wireless fidelity, wireless network) throughput performance value, and a flow performance value of a beam data stream The several performance values of the device B are also a dominant frequency performance value of a CPU (Central Processing Unit, central processing unit), a WIFI (wireless fidelity, wireless network) throughput performance value, and flow performance of a beam data stream.

That the comprehensive performance value of the device A is obtained by means of calculation according to a performance value of the device A may be specifically classified into two cases. Case 1: The comprehensive performance value of the device A is obtained according to several coefficients and by performing weighting calculation on the several performance values of the device A by using a weighting method. The several coefficients are in a one-to-one correspondence with the several performance values of the device A. In an embodiment, coefficients in the several coefficients are multiplied by corresponding performance values in the several performance values of the device A, to obtain several multiplication results of the device A, and summation is performed on the several multiplication results of the device A, to obtain the comprehensive performance value of device A. Case 2: One performance value of the device A is enabled to be the comprehensive performance value of the device A. Similarly, the comprehensive performance value of the device B is obtained by means of calculation according to the performance value of the device B. In an embodiment, the foregoing several coefficients are obtained by means of calculation by using an analytic hierarchy process.

Step S104: Set the device A as a group server or a group client of a primary network according to the comparison result AB. In an embodiment, of the device A and the device B, a device whose comprehensive performance value is relatively larger is set as the group server of the primary network, and a device whose comprehensive performance value is relatively smaller is set as the group client of the primary network. A fixed IP address 192.168.43.1 of a group server in the WIFI Direct protocol is allocated to the device that is set as the group server of the primary network. In this specification, a group server is a device used as a data exchange hub in an established network, and data exchange among group clients is completed by using the group server. When the group clients exchange data, one group client first sends the data to the group server, and the group server then sends the data to another group client.

Figure 2:
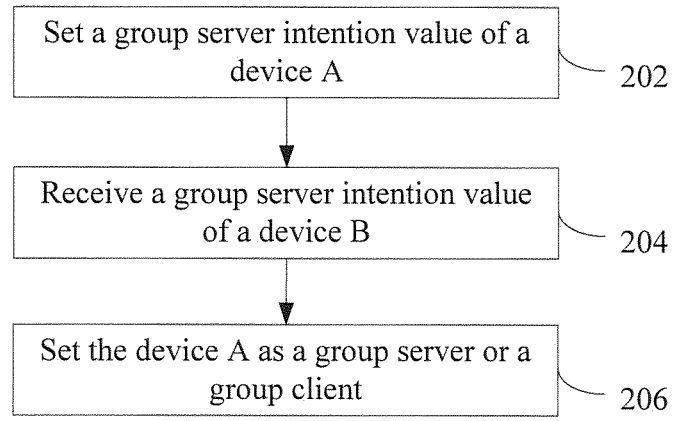
FIG. 2 is a schematic flowchart of apart of steps of a network establishing method according to Embodiment 1 of the present invention.

In an embodiment, as shown in FIG. 2, step S104 includes the following steps:

Step S202: Set a group server intention value of the device A according to the comparison result AB. In an embodiment, a group server intention value of a device whose comprehensive performance value is relatively large is set to be relatively large, and a group server intention value of a device whose comprehensive performance value is relatively small is set to be relatively small.

Step S204: Receive a group server intention value of the device B, where the group server intention value of the device B is determined by device B according to the comparison result AB. In an embodiment, the device A sends the comparison result AB to the device B, so that the device B can set the group server intention value of the device B according to the comparison result AB.

Step S206: Set the device A as the group server of the primary network or the group client of the primary network according to the group server intention value of the device A and the group server intention value of the device B. If the device A is set as the group server, the fixed IP address 192.168.43.1 of a group server in the WIFI Direct protocol is allocated to the device A.

Specifically, in an embodiment, the foregoing comparison result AB is that the comprehensive performance value of the device A is greater than the comprehensive performance value of that device B. The device A sets the group server intention value of the device A to a maximum value, such as 15, of a group server intention value in the WIFI Direct protocol according to the foregoing comparison result AB. The device B sets the group server intention value of the device B as a minimum value, such as 0, of the group server intention value in the WIFI Direct protocol according to the foregoing comparison result AB. Either the device A or the device B, for example, the device A, sends a group server negotiation request signal to the peer, for example, the device B, where the request signal includes the group server intention value 15 of the device A. After receiving the group server negotiation request signal, the device B sends a group server negotiation response signal to the device A, where the response signal includes the group server intention value 0 of the device B. Both the device A and the device B compare the group server intention value of the device A with the group server intention value of the device B. The group server intention value of the device A is larger than the group server intention value of the device B. Therefore, the device A sets the device A as the group server and the device B sets the device B as the group client.

On the contrary, if the comparison result AB is that the comprehensive performance value of the device B is larger than the comprehensive performance value of the device A, the device B sets the device B as the group server of the primary network, and allocates the fixed IP address 192.168.43.1 of a group server in the WIFI Direct protocol to the device B, and the device A sets the device A as the group client of the primary network.

In another embodiment, before the primary network that includes the device A and the device B is established according to the foregoing method, the device A is already set as the group server of the primary network or a group server of another network (such as a network that includes the device A and another device) according to another method, and has the fixed IP address 192.168.43.1 of a group server in the WIFI Direct protocol. If the device A is still set as the group server of the primary network according to the comparison result AB by following the foregoing method, step S104 includes keeping the device A as the group server, and keeping an IP address of the device A as the fixed IP address 192.168.43.1 of a group server in the WIFI Direct protocol.

It can be learned from the foregoing that, in a network established according to the method in this embodiment, a data exchange capability of a device used as a group server is the strongest among devices in the network. During data exchange, the device having the strongest data exchange capability can be fully used, thereby enhancing a data exchange capability of the network.

Embodiment 2

Figure 3:
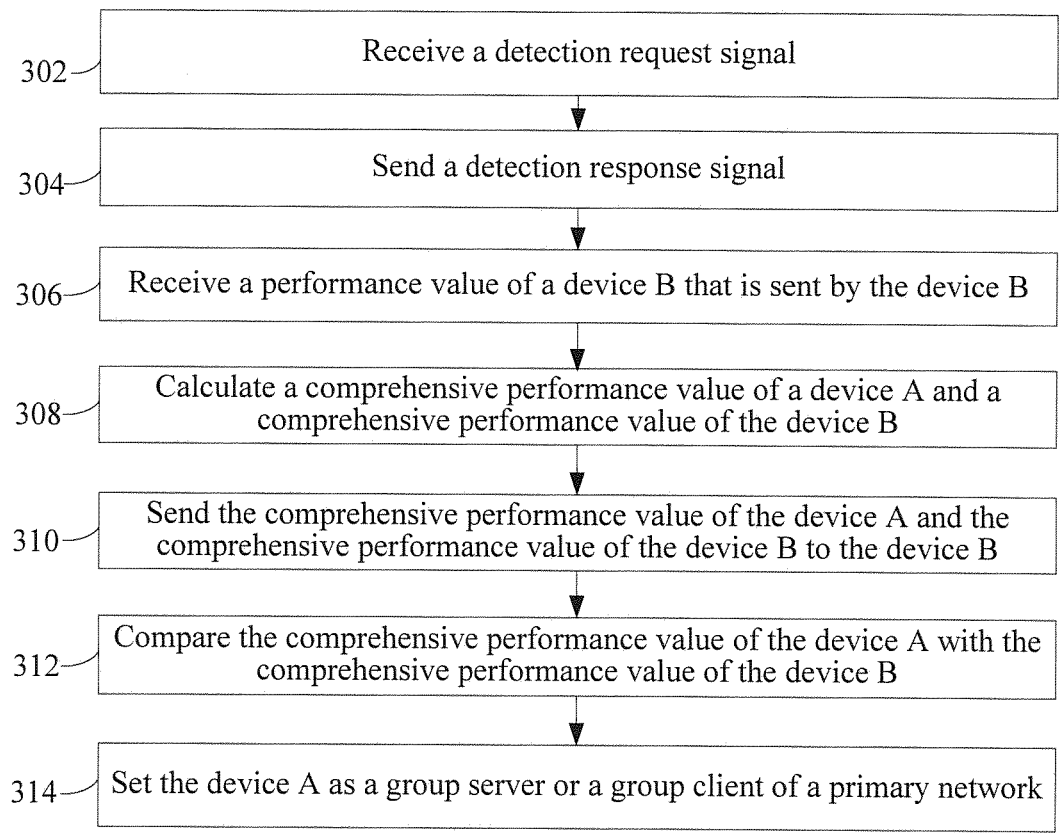
FIG. 3 is a schematic flowchart of a network establishing method according to Embodiment 2 of the present invention.
Figure 4:
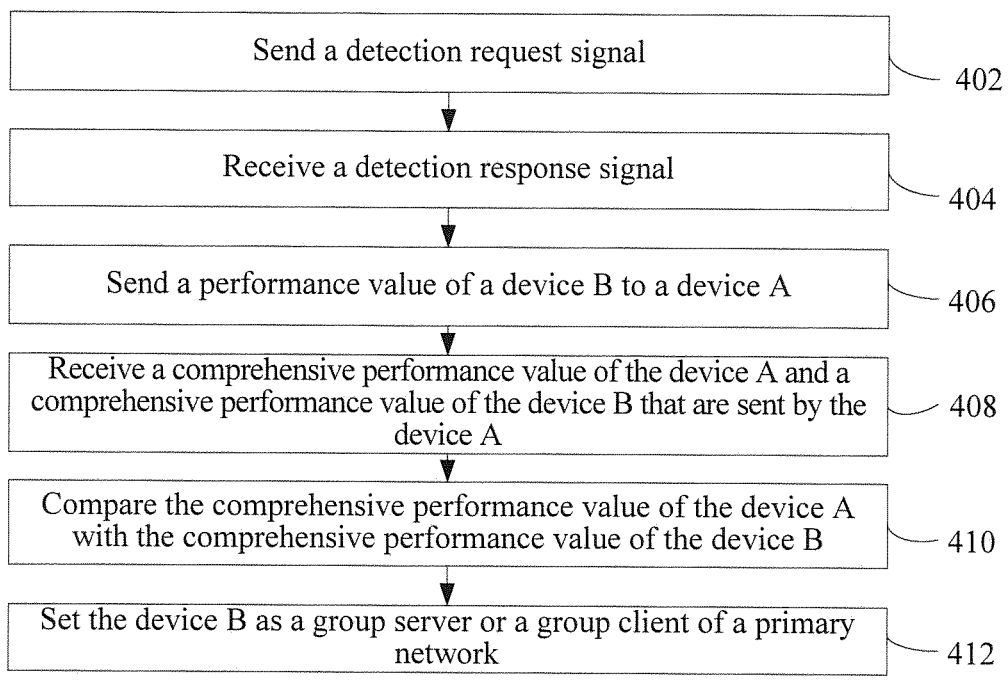
FIG. 4 is a schematic flowchart of another network establishing method according to Embodiment 2 of the present invention.

FIG. 3 and FIG. 4 are schematic flowcharts of a network establishing method according to Embodiment 2 of the present invention.

A primary network system includes a device A and a device B. FIG. 3 is a schematic flowchart of an establishing method in a process in which a device A establishes a primary network according to Embodiment 2 of the present invention. FIG. 4 is a schematic flowchart of an establishing method in a process in which a device B establishes a primary network according to Embodiment 2 of the present invention. Description in FIG. 3 and FIG. 4 is made with reference to FIG. 1 and FIG. 2.

At the beginning, both the device A and the device B send a detection request signal and monitor whether a detection response signal corresponding to the detection request signal is received. Either the device A or the device B, for example, the device B, sends the detection request signal in step S402; and the other device, for example, the device A, receives the detection request signal sent by the device B in step S302 and sends the detection response signal corresponding to the detection request signal in step S304. In step 404, the device B receives the detection response signal. Now, a process of discover signaling interaction between the device A and the device B is complete. After the process of discover signaling interaction is complete, the device A and the device B may send a signal or data to each other.

In step 406, the device B sends a performance value of the device B to the device A. In step 306, the device A receives the performance value of the device B, and in step 308, calculates a comprehensive performance value of the device A and a comprehensive performance value of the device B by using a method in step S102 in FIG. 1.

Then, in step 310, the device A sends the comprehensive performance value of the device A and the comprehensive performance value of the device B to the device B. After receiving the comprehensive performance value of the device A and the comprehensive performance value of the device B in step 408, the device B compares the comprehensive performance value of the device A with the comprehensive performance value of the device B, to obtain a comparison result AB in step 410. In step 312, the device A also compares the comprehensive performance value of the device A with the comprehensive performance value of the device B, to obtain the comparison result AB. In step 314, if the comparison result AB is that the comprehensive performance value of the device A is larger than the comprehensive performance value of the device B, the device A sets the device A as a group server of a primary network, and allocates a fixed IP address 192.168.43.1 of a group server in the WIFI Direct protocol to the device A; and if the comparison result AB is that the comprehensive performance value of device A is smaller than the comprehensive performance value of device B, the device A sets the device A as a group client of the primary network. Similarly, in step 412, the device B sets the device B as the group server or the group client of the primary network according to the comparison result AB.

It can be learned that, step S102 that the device A acquires the comparison result AB obtained by comparing the comprehensive performance value of the device A with the comprehensive performance value of the device B may include the following steps in FIG. 3:

Step 306: The device A receives a performance value of the device B.

Step 308: The device A calculates a comprehensive performance value of the device A according to a performance value of the device A, and calculates a comprehensive performance value of the device B according to the received a performance value of the device B.

Step 312: The device A compares the comprehensive performance value of the device A with the comprehensive performance value of the device B, to obtain a comparison result AB.

Step S102 that the device B acquires the comparison result AB obtained by comparing the comprehensive performance value of the device A with the comprehensive performance value of the device B may include the following steps in FIG. 4:

Step 406: The device B sends a performance value of the device B to the device A.

Step 408: The device B receives a comprehensive performance value of the device A and a comprehensive performance value of the device B, where the comprehensive performance value of the device A and the comprehensive performance value of the device B are obtained by the device A by means of calculation according to one or several performance values of the device A and the one or several performance values of the device B that are sent by the device B.

Step 410: The device B compares the comprehensive performance value of the device A with the comprehensive performance value of the device B, to obtain a comparison result AB.

Embodiment 3

Figure 5:
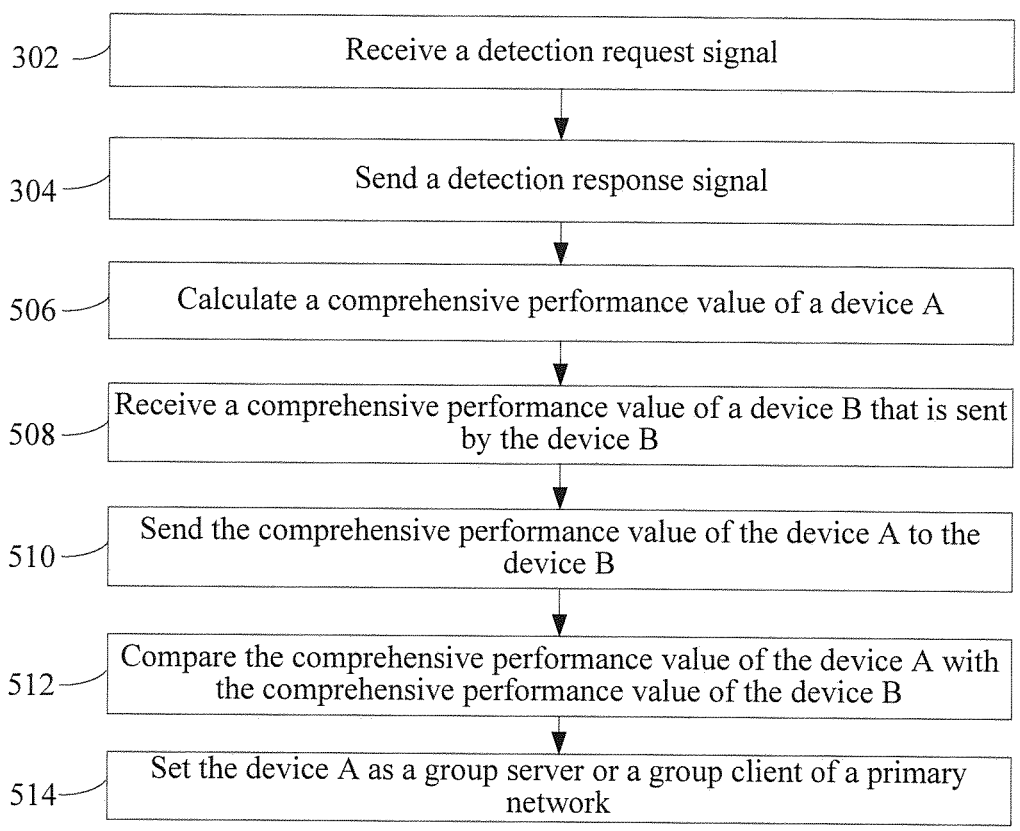
FIG. 5 is a schematic flowchart of a network establishing method according to Embodiment 3 of the present invention.
Figure 6:
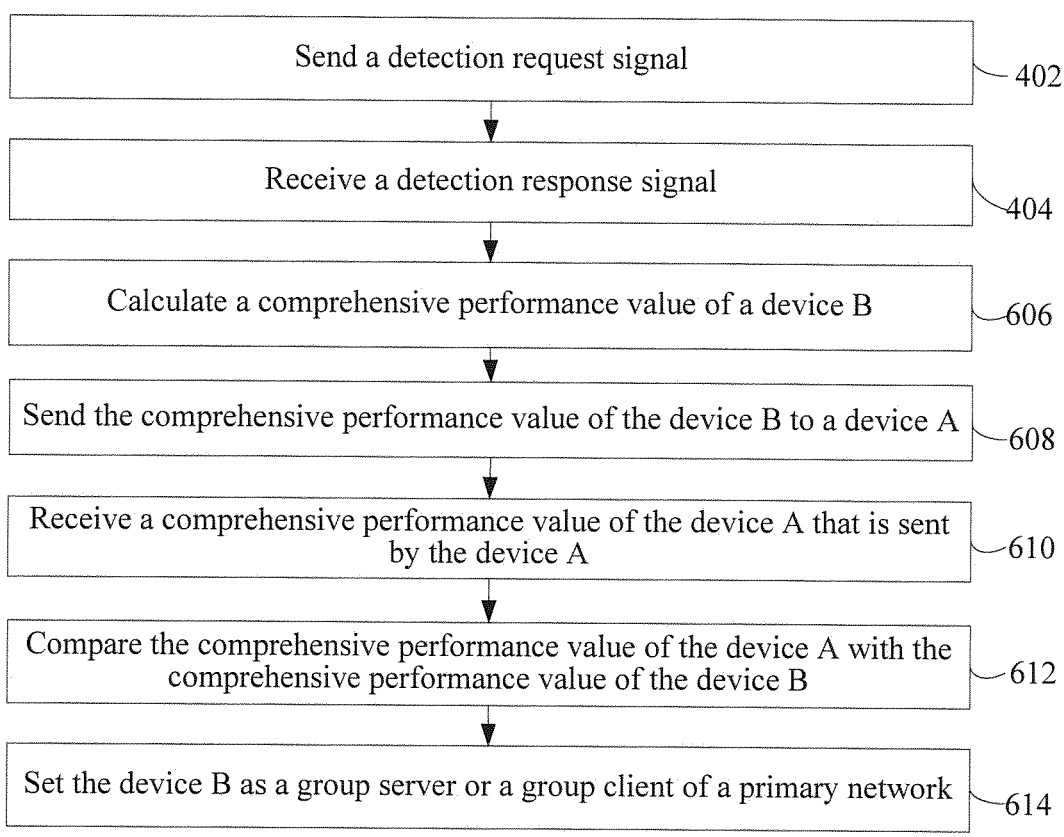
FIG. 6 is a schematic flowchart of another network establishing method according to Embodiment 3 of the present invention.

FIG. 5 and FIG. 6 are schematic flowcharts of a network establishing method according to Embodiment 3 of the present invention.

A primary network system includes a device A and a device B. FIG. 5 is a schematic flowchart of a method for establishing a primary network by a device A according to Embodiment 3 of the present invention. FIG. 6 is a schematic flowchart of a method for establishing a primary network by a device B according to Embodiment 3 of the present invention. Description in FIG. 5 and FIG. 6 is made with reference to FIG. 1 to FIG. 4. Elements of a same reference numeral have a similar function or step.

In this embodiment, a process in which the device A establishes a primary network between the device A and the device B is similar to a process in which the device B establishes a primary network between the device A and the device B in the embodiment 2. However, a method in which the device A and the device B obtain a comparison result AB obtained by comparing a comprehensive performance value of the device A with a comprehensive performance value of the device B in this embodiment is different from a method in which the device A and the device B obtain the comparison result AB obtained by comparing the comprehensive performance value of the device A with the comprehensive performance value of the device B in the embodiment 2.

Step S102 that the device A acquires the comparison result AB obtained by comparing the comprehensive performance value of the device A with the comprehensive performance value of the device B may include the following steps in FIG. 5:

Step 506: The device A calculates a comprehensive performance value of the device A according to a performance value of the device A.

Step 508: The device A receives a comprehensive performance value of the device B that is sent by the device B.

Step 512: The device A compares the comprehensive performance value of the device A with the comprehensive performance value of the device B, to obtain a comparison result AB.

Step S102 that the device B acquires the comparison result AB obtained by comparing the comprehensive performance value of the device A with the comprehensive performance value of the device B may include the following steps in FIG. 6:

Step 606: The device B calculates a comprehensive performance value of the device B according to a performance value of the device B.

Step 610: The device B receives a comprehensive performance value of the device A that is sent by the device A.

Step 612: The device B compares the comprehensive performance value of the device A with the comprehensive performance value of the device B, to obtain the comparison result AB.

Embodiment 4

Figure 7:
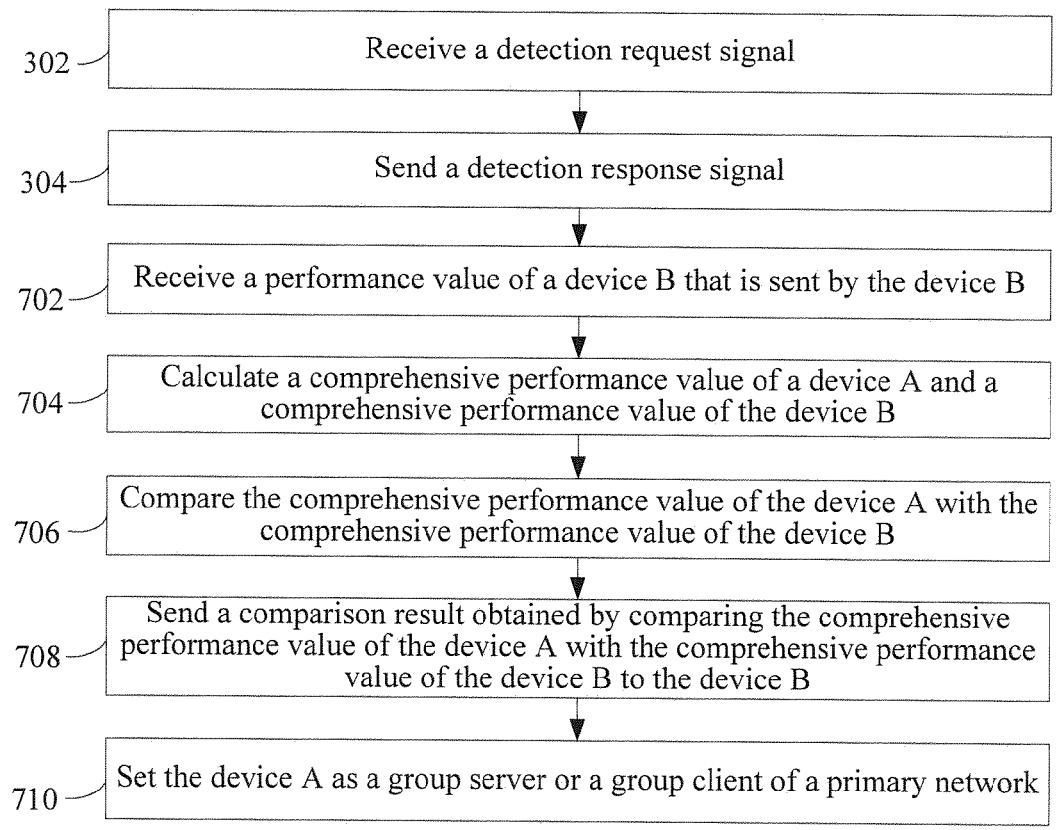
FIG. 7 is a schematic flowchart of a network establishing method according to Embodiment 4 of the present invention.
Figure 8:
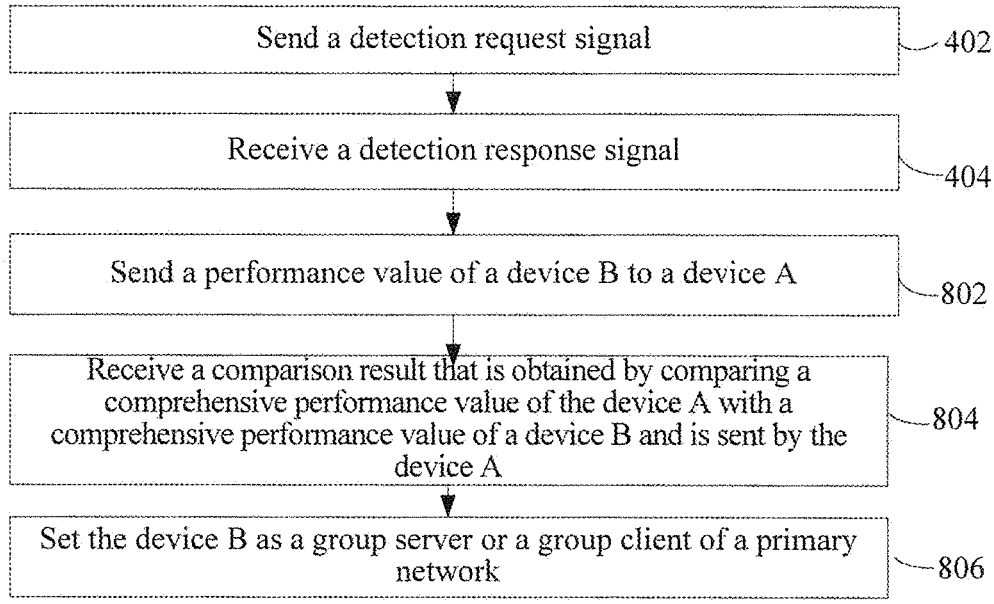
FIG. 8 is a schematic flowchart of another network establishing method according to Embodiment 4 of the present invention.

FIG. 7 and FIG. 8 are schematic flowcharts of a network establishing method according to Embodiment 4 of the present invention.

A primary network system includes a device A and a device B. FIG. 7 is a schematic flowchart of a method for establishing a primary network by a device A according to Embodiment 4 of the present invention. FIG. 8 is a schematic flowchart of a method for establishing a primary network by a device B according to Embodiment 4 of the present invention. Description in FIG. 7 and FIG. 8 is made with reference to FIG. 1 to FIG. 6. Elements of a same reference numeral have a similar function or step.

in this embodiment, a process in which the device A establishes a primary network between the device A and the device B is similar to a process in which the device B establishes a primary network between the device A and the device B in the embodiment 2. However, a method in which the device A and the device B obtain a comparison result AB obtained by comparing a comprehensive performance value of the device A with a comprehensive performance value of the device B in this embodiment is different from a method in which the device A and the device B obtain the comparison result AB obtained by comparing the comprehensive performance value of the device A with the comprehensive performance value of the device B in the embodiment 2.

Step S102 that the device A acquires the comparison result AB obtained by comparing the comprehensive performance value of the device A with the comprehensive performance value of the device B may include the following steps in FIG. 7:

Step 702: The device A receives a performance value of the device B.

Step 704: The device A calculates a comprehensive performance value of the device A according to a performance value of the device A, and calculates a comprehensive performance value of the device B according to the received a performance value of the device B.

Step 706: The device A compares the comprehensive performance value of the device A with the comprehensive performance value of the device B, to obtain a comparison result AB.

Step S102 that the device B acquires the comparison result AB obtained by comparing the comprehensive performance value of the device A with the comprehensive performance value of the device B may include the following steps in FIG. 8:

Step 802: The device B sends a performance value of the device B to the device A.

Step 804: The device B receives a comparison result AB, where the comparison result AB is obtained by the device A by comparing a comprehensive performance value of the device A with a comprehensive performance value of the device B, where the comprehensive performance value of the device B is obtained by the device A by means of calculation according to the performance value of the device B that is sent by the device B, and the comprehensive performance value of the device A is obtained by the device A by means of calculation according to a performance value of the device A.

In an embodiment, after completing a signaling interaction process, the device A and the device B first set the device A and the device B as an initial group server or an initial group client of the primary network according to an initial value of a group server intention value of the device A and an initial value of a group server intention value of the device B; and then, as described in Embodiment 1 to Embodiment 4, set the device A and the device B as a group server or a group client of the primary network according to the comprehensive performance value of the device A and the comprehensive performance value of the device B. In an embodiment, if the device A is set as the initial group server of the primary network, the device B sends the performance value of the device B to the device A. The device A receives the performance value of the device B that is sent by the device B, and the device A acquires the comprehensive performance value of the device A by means of calculation according to the performance value of the device A, and the device A acquires the comprehensive performance value of the device B by means of calculation according to the received a performance value of the device B.

In an embodiment, the initial value of the group server intention value of the device A and the initial value of the group server intention value of the device B are preset. Specifically, the foregoing process in which the device A and the device B are set as the initial group server or the initial group client of the primary network according to the initial value of the group server intention value of the device A and the initial value of the group server intention value of the device B is as follows:

The device A sends a group server negotiation request signal to the device B, where the request signal includes the initial value of the group server intention value of the device A, such as 3; the device B receives the request signal and sends a group server negotiation response signal to the device A, where the response signal includes the initial value of the group server intention value of the device B, such as 15. The device A and the device B separately compare the initial value of the group server intention value of the device A with the initial value of the group server intention value of the device B, and separately set the device A and the device B as the initial group server or the initial group client according to a comparison result. For example, if the initial value of the group server intention value of the device A is greater than the initial value of the group server intention value of the device B, the device A sets the device A as the initial group server and the device B sets the device B as the initial group client.

In Embodiment 1 to Embodiment 4, roles of the device A and the device B may be interchanged. That is, the device A may execute steps executed by the B in the foregoing description, and the device B may execute steps executed by the device A in the foregoing description.

Embodiment 5

Figure 9:
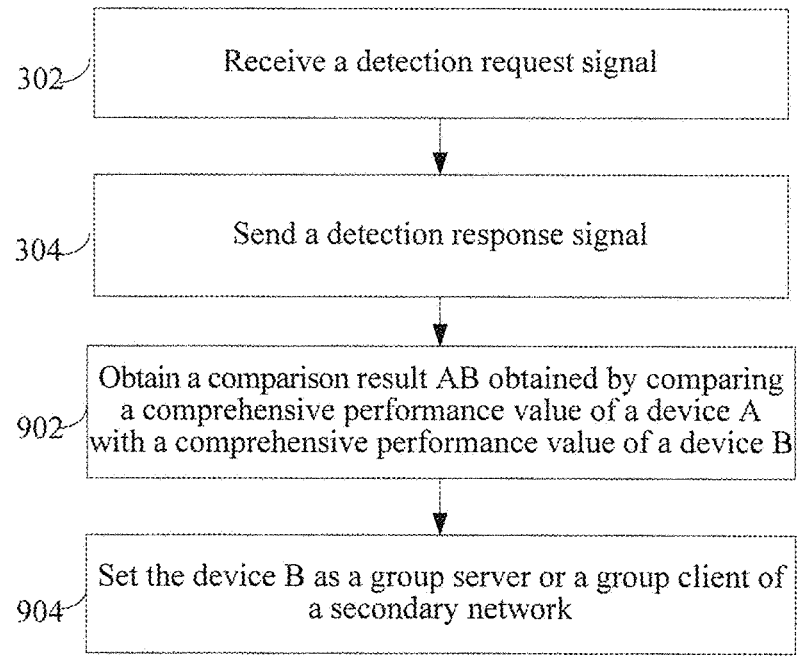
FIG. 9 is a schematic flowchart of a network establishing method according to Embodiment 5 of the present invention.
Figure 10:
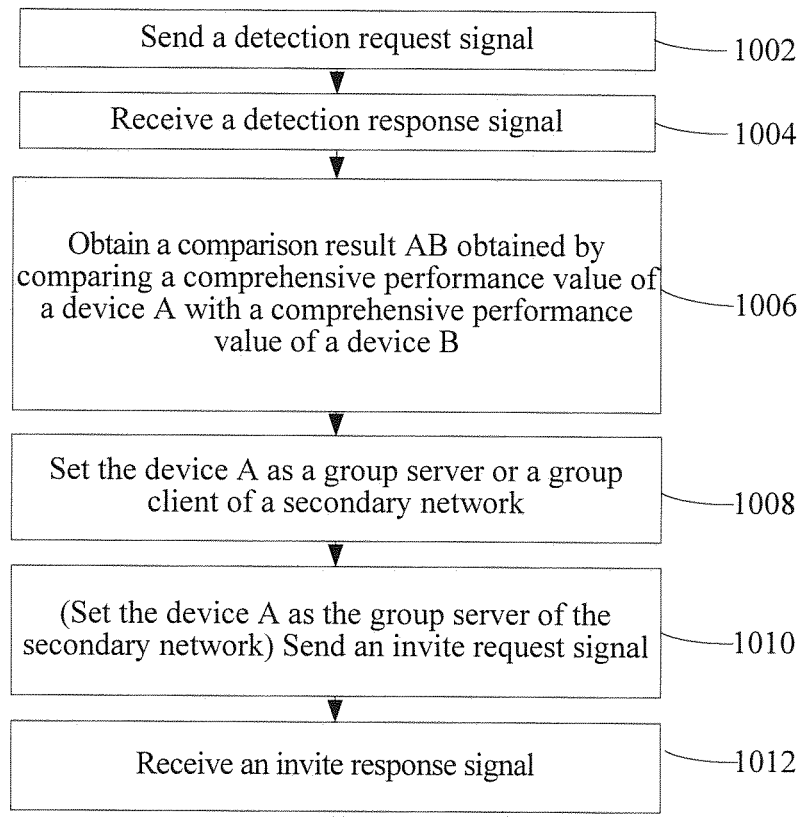
FIG. 10 is a schematic flowchart of another network establishing method according to Embodiment 5 of the present invention.
Figure 11:
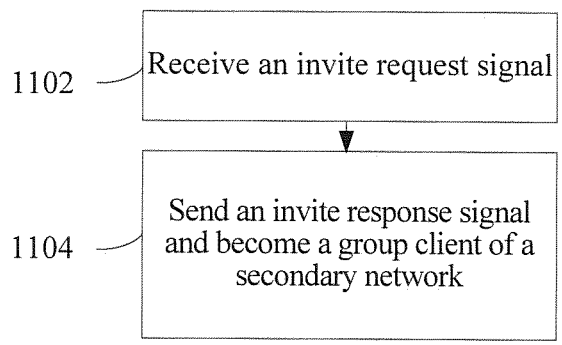
FIG. 11 is a schematic flowchart of still another network establishing method according to Embodiment 5 of the present invention.

FIG. 9, FIG. 10, and FIG. 11 are schematic flowcharts of a network establishing method according to Embodiment 5 of the present invention.

A secondary network system includes a device A, a device B, and a device C. FIG. 9 is a schematic flowchart of a method for establishing a secondary network by a device B according to Embodiment 5 of the present invention. FIG. 10 is a schematic flowchart of a method for establishing a secondary network by a device A according to Embodiment 5 of the present invention. FIG. 11 is a schematic flowchart of a method for establishing a secondary network by a device C according to Embodiment 5 of the present invention. Description in FIG. 9 to FIG. 11 is made with reference to FIG. 1 to FIG. 8. Elements of a same reference numeral have a similar function or step.

The device B and the device C first establish a primary network. In an embodiment, the device B and the device C set the device B and the device C as a group server or a group client of the primary network according to an initial value of a group server intention value of the device B and an initial value of a group server intention value of the device C. In another embodiment, the device B and the device C establish the primary network in any manner in Embodiment 1 to Embodiment 4, and set the device B as a group server of the primary network and set the device C as a group client of the primary network.

Then, the device A, together with the device B and the device C, establishes a secondary network. As shown in FIG. 9 and FIG. 10, in step 302, step 304, step 1002, and step 1004, the device A and the device B first complete a signaling interaction process. Then, by using a manner similar to any manner in Embodiment 1 to Embodiment 4, in step 902 and step 904, the device B acquires a comparison result AB obtained by comparing a comprehensive performance value of the device A with a comprehensive performance value of the device B, and sets the device B as a group server or a group client of the secondary network according to the comparison result AB, where the comprehensive performance value of the device A is obtained by means of calculation according to a performance value of the device A, and the performance value of the device A indicate one or more aspects of a data exchange capability of the device A. In an embodiment, a method for acquiring the comprehensive performance value of the device A by means of calculation according to a performance value of the device A is the same as a method for acquiring the comprehensive performance value of the device A by means of calculation according to a performance value of the device A in Embodiment 1. In step 1006 and step 1008, the device A acquires the comparison result AB obtained by comparing the comprehensive performance value of the device A with the comprehensive performance value of the device B, and sets the device A as the group server or the group client of the secondary network according to the comparison result AB.

Specifically, a method in which the device A and the device B obtain a comparison result AB obtained by comparing the comprehensive performance value of the device A with the comprehensive performance value of the device B is similar to a method in which the device A and the device B obtain a comparison result obtained by comparing the comprehensive performance value of the device A with the comprehensive performance value of the device B in Embodiment 2 to Embodiment 4. In an embodiment, a method in which the device A acquires the comparison result AB obtained by comparing the comprehensive performance value of the device A with the comprehensive performance value of the device B includes: receiving, by the device A, a performance value of the device B; calculating, by the device A, the comprehensive performance value of the device A according to the performance value of the device A, and calculating the comprehensive performance value of the device B according to the received a performance value of the device B; and comparing, by the device A, the comprehensive performance value of the device A with the comprehensive performance value of the device B, to obtain the comparison result AB.

For the device A, before the device A acquires the comparison result AB obtained by comparing the comprehensive performance value of the device A with the comprehensive performance value of the device B, the device B in the primary network is already set as the group server of the primary network, where the primary network includes the device B and the device C.

If the device B is set as the group server of the secondary network and the device A is set as the group client of the secondary network, the device C becomes a group client in the secondary network. If the device B is set as the group client of the secondary network and the device A is set as the group server of the secondary network, in step 1010 shown in FIG. 10, the device A sends an invite request signal for inviting the device C to become a group client of the secondary network. In step 1102 shown in FIG. 11, the device C receives the invite request signal, and returns an invite response signal to the device A in step 1104, where the invite response signal notifies the device A that the device C becomes the group client of the secondary network.

Similar to Embodiment 1 to Embodiment 4, in this embodiment, roles of the device A, the device B, and the device C may be interchanged.

It can be learned from the foregoing that, in this embodiment, after establishing of a primary network is complete, and if there is another device that needs to establish, together with the original primary network, a secondary network including the another device, according to this network establishing method, a data exchange capability of the another device is compared with a data exchange capability of a device used as a group server in the primary network, and a device having a stronger data exchange capability is selected from the two devices as a group server of the secondary network. If a device having a stronger data exchange capability is also selected in the primary network as the group server of the primary network, in the secondary network established according to this method, a device having the strongest data exchange capability among all devices is selected as the group server of the secondary network. Therefore, during data exchange, the device having the strongest data exchange capability can be fully used, thereby enhancing a data exchange capability of a network.

The following describes in detail apparatuses and systems in the present invention that are corresponding to the foregoing methods in Embodiment 1 to Embodiment 5. Description in the following embodiments is made with reference to FIG. 1 to FIG. 11. Elements of a same reference numeral have a similar function or step.

Embodiment 6

Figure 12:
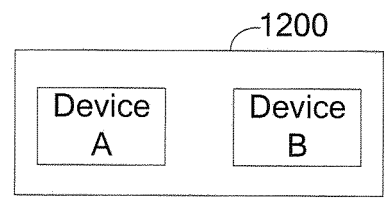
FIG. 12 is a schematic structural diagram of a primary network according to Embodiment 6 of the present invention.

FIG. 12 is a schematic structural diagram 1200 of a primary network according to Embodiment 6 of the present invention. The primary network includes a device A and a device B.

Figure 13:
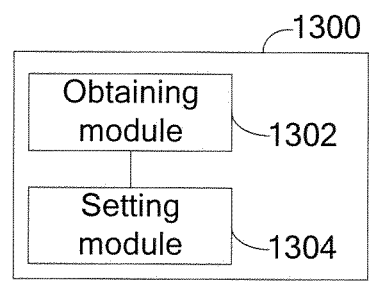
FIG. 13 is a schematic structural diagram of Embodiment 1 of a device A in a primary network.

FIG. 13 is a schematic structural diagram 1300 of a device A in a primary network 1200. The device A includes an acquiring module 1302 and a setting module 1304. The acquiring module 1302 is configured to acquire a comparison result AB obtained by comparing a comprehensive performance value of a device A with a comprehensive performance value of a device B, where the comprehensive performance value of the device A is obtained by means of calculation according to a performance value of the device A, and the comprehensive performance value of the device B is obtained by means of calculation according to a performance value of the device B, where the performance value of the device A indicate one or more aspects of a data exchange capability of the device A, and the performance value of the device B respectively indicate one or more aspects of a data exchange capability of the device B. The performance value of the device A and the device B include a dominant frequency performance value of a CPU (Central Processing Unit, central processing unit), a WIFI (wireless fidelity, wireless network) throughput performance value, and flow performance of a beam data stream. The setting module 1304 is configured to set the device A as a group server or a group client of the primary network according to the comparison result AB, where the primary network includes the device A and the device B.

Specifically, that the comprehensive performance value of the device A is obtained by means of calculation according to a performance value of the device A, and the comprehensive performance value of the device B is obtained by means of calculation according to a performance value of the device B is: if the device A and the device B have several performance values each, acquiring, the comprehensive performance value of the device A by performing, according to several coefficients and by using a weighting method, weighting calculation on the several performance values of the device A, and acquiring the comprehensive performance value of the device B by performing, according to the several coefficients and by using the weighting method, weighting calculation on the several performance values of the device B; or if the device A and the device B have only one performance value each, enabling one performance value of the device A to be the comprehensive performance value of the device A, and enabling one performance value of the device B to be the comprehensive performance value of the device B.

Specifically, a process of the acquiring the comprehensive performance value of the device A by performing, according to several coefficients and by using a weighting method, weighting calculation on the several performance values of the device A, and acquiring the comprehensive performance value of the device B by performing, according to the several coefficients and by using the weighting method, weighting calculation on the several performance values of the device B is as follows: multiplying, on one-to-one basis, coefficients in the several coefficients by corresponding performance values in the several performance values of the device A, to obtain several multiplication results of the device A, and multiplying, on one-to-one basis, coefficients in the several coefficients by corresponding performance values in the several performance values of the device B, to obtain several multiplication results of the device B; and performing summation on the several multiplication results of the device A, to obtain the comprehensive performance value of the device A, and performing summation on the several multiplication results of the device B, to obtain the comprehensive performance value of the device B. The several coefficients are obtained by means of calculation by using an analytic hierarchy process.

In an embodiment, before the device A and the device B set the device A and the device B as the group server or the group client of the primary network according to the comprehensive performance value of the device A and the comprehensive performance value of the device B, the device A and the device B first set the device A and the device B as an initial group server or an initial group client of the primary network according to an initial value of a group server intention value of the device A and an initial value of a group server intention value of the device B. In this embodiment, the setting module 1304 is further configured to set, according to the initial value of the group server intention value of the device A and the initial value of the group server intention value of the device B, the device A as the initial group client of the primary network and the device B as the initial group server of the primary network, where the initial value of the group server intention value of the device A and the initial value of the group server intention value of the device B are preset.

In an embodiment, the device B has a similar function to the device A. The device B includes an acquiring module 1302' and a setting module 1304. A specific implementation manner of the acquiring module 1302' may be the same as or different from a specific implementation manner of the acquiring module 1302 of the device A.

Figure 14:
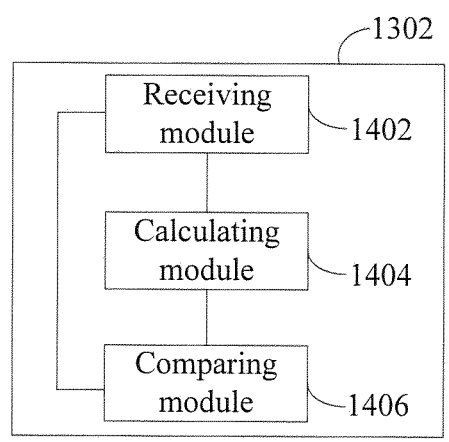
FIG. 14 is a schematic structural diagram of Embodiment 1 of an acquiring module of a device A in a primary network.
Figure 15:
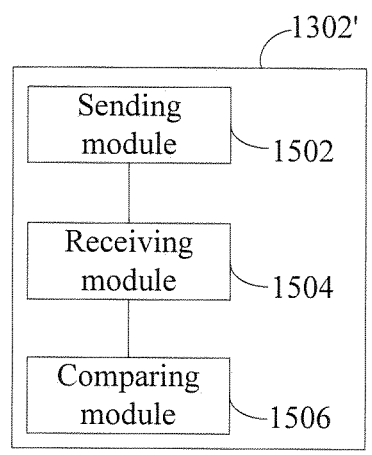
FIG. 15 is a schematic structural diagram of Embodiment 1 of an acquiring module of a device B in a primary network.

FIG. 14 is a schematic structural diagram of Embodiment 1 of an acquiring module 1302 of the device A. The acquiring module 1302 includes a receiving module 1402, a calculating module 1404, and a comparing module 1406. The receiving module 1402 is configured to receive the performance value of the device B. The calculating module 1404 is configured to calculate the comprehensive performance value of the device A and the comprehensive performance value of the device B. The comparing module 1406 is configured to compare the comprehensive performance value of the device A with the comprehensive performance value of the device B, to obtain the comparison result AB. Correspondingly, FIG. 15 is a schematic structural diagram of Embodiment 1 of an acquiring module 1302' of the device B. The acquiring module 1302' includes a sending module 1502, a receiving module 1504, and a comparing module 1506. The sending module 1502 is configured to send the performance value of the device B to the device A so that the device A can obtain the comprehensive performance value of the device B by means of calculation according to the received a performance value of the device B. The receiving module 1504 is configured to receive the comprehensive performance value of the device A and the comprehensive performance value of the device B that are sent by the device A. The comparing module 1506 is configured to compare the comprehensive performance value of the device A with the comprehensive performance value of the device B, to obtain the comparison result AB.

Figure 16:
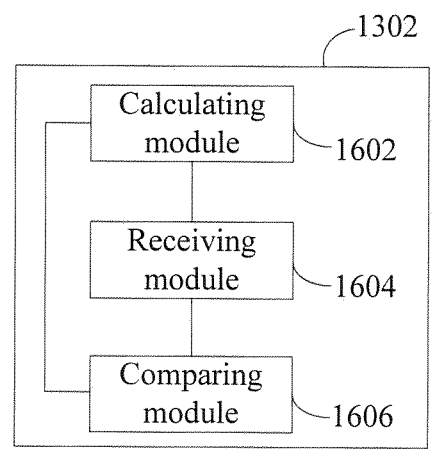
FIG. 16 is a schematic structural diagram of Embodiment 2 of an acquiring module of a device A in a primary network.
Figure 17:
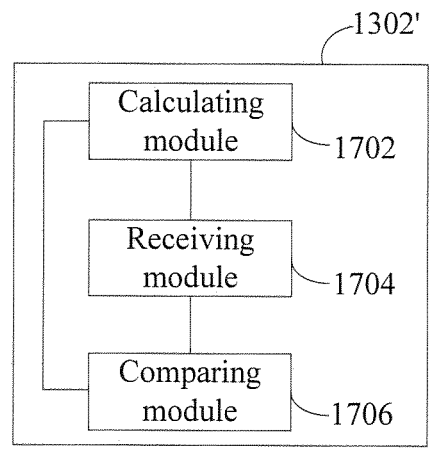
FIG. 17 is a schematic structural diagram of Embodiment 2 of an acquiring module of a device B in a primary network.

FIG. 16 is a schematic structural diagram of Embodiment 2 of an acquiring module 1302 of the device A. The acquiring module 1302 includes a calculating module 1602, a receiving module 1604, and a comparing module 1606. The calculating module 1602 is configured to calculate the comprehensive performance value of the device A. The receiving module 1604 is configured to receive the comprehensive performance value of the device B. The comparing module 1606 is configured to compare the comprehensive performance value of the device A with the comprehensive performance value of the device B, to obtain the comparison result AB. Correspondingly, FIG. 17 is a schematic structural diagram of Embodiment 2 of an acquiring module 1302 of the device B. The acquiring module 1302' includes a calculating module 1702, a receiving module 1704, and a comparing module 1706. The calculating module 1702 is configured to calculate the comprehensive performance value of the device B. The receiving module 1704 is configured to receive the comprehensive performance value of the device A. The comparing module 1706 is configured to compare the comprehensive performance value of the device A with the comprehensive performance value of the device B, to obtain the comparison result AB.

Figure 18:
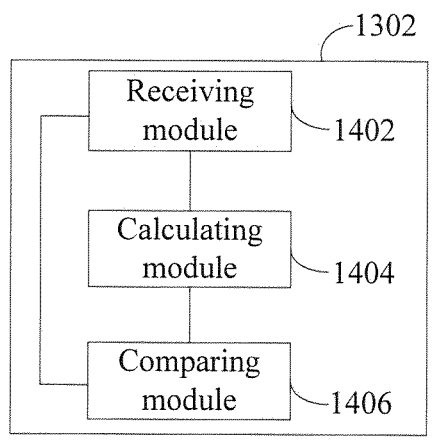
FIG. 18 is a schematic structural diagram of Embodiment 3 of an acquiring module of a device A in a primary network.
Figure 19:
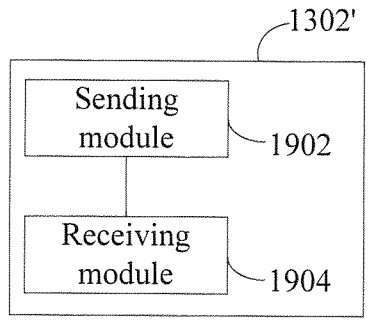
FIG. 19 is a schematic structural diagram of Embodiment 3 of an acquiring module of a device B in a primary network.

FIG. 18 is a schematic structural diagram of Embodiment 3 of an acquiring module 1302 of the device A. In this embodiment, the acquiring module 1302 has a receiving module 1402, a calculating module 1404, and a comparing module 1406 that are the same as those in the embodiment shown in FIG. 14. Correspondingly, FIG. 19 is a schematic structural diagram of Embodiment 3 of an acquiring module 1302' of the device B. The acquiring module 1302' includes a sending module 1902 and a receiving module 1904. The sending module 1902 is configured to send the performance value of the device B to the device A, so that the device A can obtain the comprehensive performance value of the device B by means of calculation according to the received a performance value of the device B. The receiving module 1904 is configured to receive the comparison result AB, where the comparison result AB is obtained by the device A by comparing the comprehensive performance value of the device A with the comprehensive performance value of the device B, and the comprehensive performance value of the device A is obtained by the device A by means of calculation.

Figure 20:
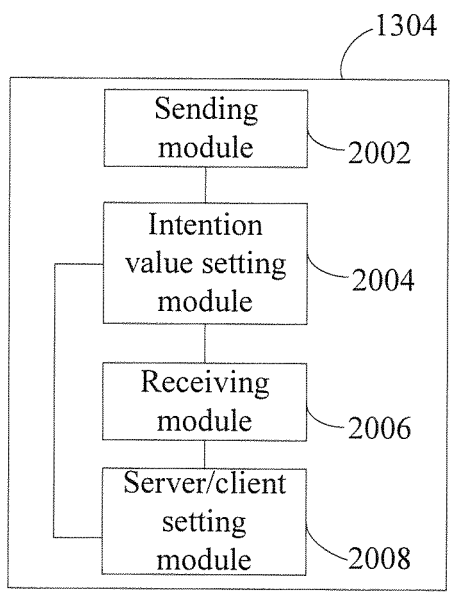
FIG. 20 is a schematic structural diagram of Embodiment 1 of a setting module of a device A in a primary network.

FIG. 20 is a schematic structural diagram of Embodiment 1 of a setting module 1304 of the device A. The setting module 1304 includes an intention value setting module 2004, a receiving module 2006, and a server/client setting module 2008. The intention value setting module 2004 is configured to set the group server intention value of the device A according to the comparison result AB obtained by comparing the comprehensive performance value of the device A with the comprehensive performance value of the device B. The receiving module 2006 is configured to receive the group server intention value of the device B, where the group server intention value of the device B is determined by the device B according to the comparison result AB. The server/client setting module 2008 is configured to set the device A as the group server of the primary network or the group client of the primary network according to the group server intention value of device A and the group server intention value of the device B. In an embodiment, the setting module 1304 further includes a sending module 2002, which is configured to send the comparison result AB to the device B.

In embodiments shown in FIG. 13 to FIG. 18, a function of the device A and a function of the device B may be interchanged. That is, the device A may have the above-described function of the device B, and the device B may have the above-described function of the device A.

Embodiment 7

Figure 21:
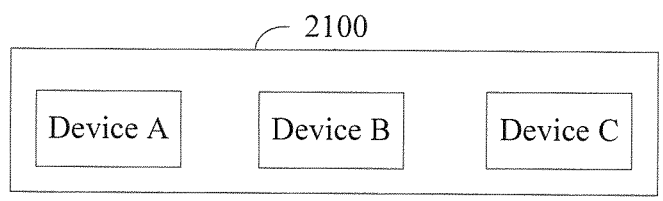
FIG. 21 is a schematic structural diagram of a secondary network according to Embodiment 7 of the present invention.

FIG. 21 is a schematic structural diagram 2100 of a secondary network according to Embodiment 7 of the present invention. A device C and a device B establish a primary network. In an embodiment, the device B is a group server of the primary network, and the device C is a group client of the primary network. After establishing of the primary network is complete, the device A participates in establishing the secondary network. The secondary network includes the device A, the device B, and a device C.

In addition to acquiring, in a process of establishing the primary network, a comparison result BC obtained by comparing a comprehensive performance value of the device C with a comprehensive performance value of the device B, an acquiring module of the device B is further configured to acquire, in a process of establishing the secondary network, a comparison result AB obtained by comparing a comprehensive performance value of the device A and the comprehensive performance value of the device B, where the comprehensive performance value of the device A is obtained by means of calculation according to a performance value of the device A, and the performance value of device A indicate one or more aspects of a data exchange capability of the device A.

In an embodiment, as shown in FIG. 14, the acquiring module of the device B includes a receiving module, a calculating module, and a comparing module. In addition to receiving a performance value of the device C in the process of establishing the primary network, the receiving module is further configured to receive the performance value of the device A in the process of establishing the secondary network. In addition to calculating the comprehensive performance value of the device C and the comprehensive performance value of the device B in the process of establishing the primary network, the calculating module is further configured to calculate the comprehensive performance value of the device A and the comprehensive performance value of the device B in the process of establishing the secondary network. In addition to comparing, in the process of establishing the primary network, the comprehensive performance value of the device C with the comprehensive performance value of the device B, to obtain the comparison result BC, the comparing module is further configured to compare, in the process of establishing the secondary network, the comprehensive performance value of the device A with the comprehensive performance value of the device B, to obtain the comparison result AB.

In addition to setting the device B as the group server or the group client of the primary network according to the comparison result BC in the process of establishing the primary network (in this embodiment, the device B is set as the group server of the primary network), a setting module of the device B is further configured to set the device B as a group server or a group client of the secondary network according to the comparison result AB in the process of establishing the secondary network.

The device A includes a determining module, which is configured to: before an acquiring module of the device A acquires the comparison result AB obtained by comparing the comprehensive performance value of the device A with the comprehensive performance value of the device B, determine the device B as the group server of the primary network according to an IP address of the device B. In an embodiment, a group server in a network has a fixed IP address 192.168.43.1.

The device A further includes an invite sending module. If the device A is set as the group server of the secondary network, the invite sending module is configured to send an invite request signal to the group client device C of the primary network, and receive an invite response signal sent by the group client device C of the primary network and specific to the invite request signal, where the invite response signal notifies device A that the group client device C of the primary network that is corresponding to the group server device B of the primary network is changed to a group client of the secondary network that is corresponding to the group server device A of the secondary network.

The device C further includes a responding module, which is configured to: after the invite request signal sent by the group server of the secondary network is received, return the invite response signal to the group server of the secondary network, where the invite response signal notifies the group server of the secondary network that the device C becomes the group client of the secondary network.

Similar to embodiments shown in FIG. 13 to FIG. 18, in this embodiment, a function of the device A, a function of the device B, and a function of the device C may be interchanged.

Embodiment 8

In this embodiment, a device C and a device B establish a primary network. In an embodiment, the device B is a group server of the primary network, and the device C is a group client of the primary network. After establishing of the primary network is complete, a device A participates in establishing a secondary network. The secondary network includes the device A, the device B, and the device C.

Figure 22:
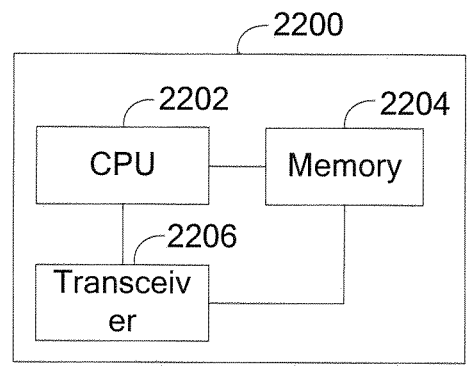
FIG. 22 is a schematic structural diagram of Embodiment 1 of a device B in a secondary network.
Figure 23:
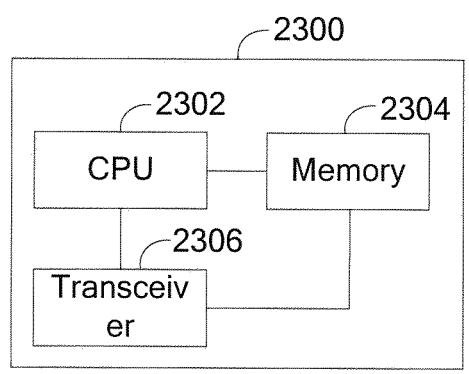
FIG. 23 is a schematic structural diagram of Embodiment 1 of a device A in a secondary network.
Figure 24:
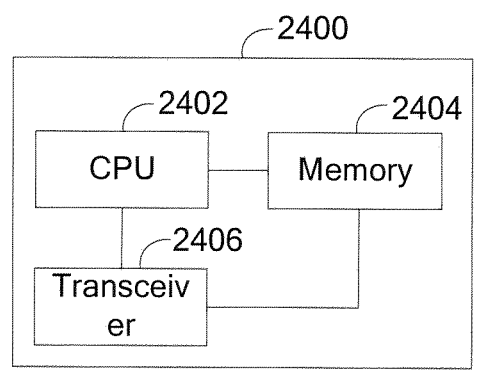
FIG. 24 is a schematic structural diagram of Embodiment 1 of a device C in a secondary network.

Description in this embodiment is made with reference to FIG. 1 to FIG. 21. Elements of a same reference numeral have a similar function or step. FIG. 22, FIG. 23, and FIG. 24 are a schematic structural diagram 2200 of a device B, a schematic structural diagram 2300 of a device A, and a schematic structural diagram 2400 of a device C respectively. As shown in FIG. 22, the device B includes a CPU 2202 (Central Processing Unit, central processing unit), a memory 2204, and a transceiver 2206. The memory 2204 is configured to store an instruction. The CPU 2202 is configured to fetch the instruction from the memory 2204, and execute the following functions together with the transceiver 2206: acquiring a comparison result CB obtained by comparing a comprehensive performance value of the device C with a comprehensive performance value of the device B, and setting the device C as the group server or the group client of the primary network according to the comparison result CB, where the comprehensive performance value of the device C is obtained by means of calculation according to a performance value of the device C, and the comprehensive performance value of the device B is obtained by means of calculation according to a performance value of the device B, where the performance value of the device C indicate one or more aspects of a data exchange capability of the device C, the performance value of the device B indicate one or more aspects of a data exchange capability of the device B, and the primary network includes the device C and the device B.

The CPU 2202 is further configured to fetch the instruction from the memory 2204, and execute the following functions together with the transceiver 2206: in a process of establishing the secondary network, acquiring a comparison result AB obtained by comparing a comprehensive performance value of the device A with the comprehensive performance value of the device B, where the comprehensive performance value of the device A is obtained by means of calculation according to a performance value of the device A, and the performance value of the device A indicate one or more aspects of a data exchange capability of the device A.

The CPU 2202 is further configured to fetch the instruction from the memory 2204, and execute the following functions together with the transceiver 2206: setting the device B as the group server or the group client of the primary network according to the comparison result BC in a process of establishing the primary network (in this embodiment, the device B is set as the group server of the primary network), and is further configured to set the device B as a group server or a group client of the secondary network according to the comparison result AB in the process of establishing the secondary network.

A part of the foregoing functions relating to data receiving and sending are completed by the transceiver 2206.

As shown in FIG. 23, the device A also includes a CPU 2302, a memory 2304, and a transceiver 2306. The CPU 2302 of the device A is configured to fetch an instruction from the memory 2304 of the device A, and execute the following functions together with the transceiver 2306: in the process of establishing the secondary network, acquiring the comparison result AB obtained by comparing the comprehensive performance value of the device A with the comprehensive performance value of the device B. In addition, the CPU of the device A is further configured to: before an acquiring module of the device A acquires the comparison result AB obtained by comparing the comprehensive performance value of the device A with the comprehensive performance value of the device B, determine the device B as the group server of the primary network according to an IP address of the device B. Moreover, if the device A is set as the group server of the secondary network, the CPU of the device A is configured to send an invite request signal to the group client device C of the primary network, and receive an invite response signal sent by the group client device C of the primary network and specific to the invite request signal, where the invite response signal notifies the device A that the group client device C of the primary network that is corresponding to the group server device B of the primary network is changed to a group client of the secondary network that is corresponding to the group server device A of the secondary network. A part of the foregoing functions relating to data receiving and sending are completed by the transceiver 2306.

As shown in FIG. 24, the device C also includes a CPU 2402, a memory 2404, and a transceiver 2406. The CPU 2402 of the device C is configured to fetch an instruction from the memory 2404 of the device C, and execute the following functions together with the transceiver 2406: in the process of establishing the primary network, acquiring the comparison result CB obtained by comparing the comprehensive performance value of the device C with the comprehensive performance value of the device B. In addition, the CPU of the device C is further configured to: after the invite request signal sent by the group server of the secondary network is received, return the invite response signal to the group server of the secondary network, where the invite response signal notifies the group server of the secondary network that the device C becomes the group client of the secondary network. A part of the foregoing functions relating to data receiving and sending are completed by the transceiver 2406.

In this application, a first device refers to the device A, a second device refers to the device B, and a third device refers to the device C.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A network establishing method, comprising:
    acquiring a first comparison result obtained by comparing a comprehensive performance value of a first device with a comprehensive performance value of a second device, wherein the comprehensive performance value of the first device is calculated according to a performance value of the first device, and the comprehensive performance value of the second device is calculated according to a performance value of the second device, wherein the performance value of the first device respectively indicate one or more aspects of a data exchange capability of the first device, and the performance value of the second device respectively indicate one or more aspects of a data exchange capability of the second device; and
    setting the first device as a group server or a group client of a primary network according to the first comparison result, wherein the primary network comprises the first device and the second device.

2. The method according to claim 1, wherein acquiring a first comparison result obtained by comparing a comprehensive performance value of a first device with a comprehensive performance value of a second device comprises:
    receiving the performance value of the second device;
    calculating the comprehensive performance value of the first device according to the performance value of the first device, and calculating the comprehensive performance value of the second device according to the received a performance value of the second device; and comparing the comprehensive performance value of the first device with the comprehensive performance value of the second device, to obtain the first comparison result.

3. The method according to claim 1, wherein acquiring a first comparison result obtained by comparing a comprehensive performance value of a first device with a comprehensive performance value of a second device comprises:
sending the performance value of the first device to the second device;
receiving the comprehensive performance value of the first device and the comprehensive performance value of the second device, wherein the comprehensive performance value of the first device is calculated by the second device according to the performance value of the first device that is sent by the first device, and the comprehensive performance value of the second device is calculated by the second device according to the performance value of the second device the first device; and
comparing the received comprehensive performance value of the first device with the received comprehensive performance value of the second device, to obtain the first comparison result.

4. The method according to claim 1, wherein acquiring a first comparison result obtained by comparing a comprehensive performance value of a first device with a comprehensive performance value of a second device comprises:
calculating the comprehensive performance value of the first device according to the performance value of the first device;
receiving the comprehensive performance value of the second device; and
comparing the comprehensive performance value of the first device with the comprehensive performance value of the second device, to obtain the first comparison result.

5. The method according to claim 1, wherein acquiring a first comparison result obtained by comparing a comprehensive performance value of a first device with a comprehensive performance value of a second device comprises:
sending the performance value of the first device to the second device; and
receiving the first comparison result, wherein the first comparison result is obtained by the second device by comparing the comprehensive performance value of the first device with the comprehensive performance value of the second device, wherein the comprehensive performance value of the first device is calculated by the second device according to the performance value of the first device that is sent by the first device, and the comprehensive performance value of the second device is calculated by the second device according to the performance value of the second device.

6. The method according to claim 1, wherein the method further comprises:
setting the first device as an initial group server or an initial group client of the primary network according to an initial value of a group server intention value of the first device and an initial value of a group server intention value of the second device, wherein the initial value of the group server intention value of the first device and the initial value of the group server intention value of the second device are preset; and
if the first device is set as the initial group server of the primary network, acquiring a first comparison result obtained by comparing a comprehensive performance value of a first device with a comprehensive performance value of a second device comprises:
receiving, by the first device, the performance value of the second device that is sent by the second device,
calculating, by the first device according to the performance value of the first device, the comprehensive performance value of the first device, and
calculating, by the first device according to the received a performance value of the second device, the comprehensive performance value of the second device.

7. The method according to claim 1, wherein if the first device is set as the group server of the primary network, the method further comprises:
acquiring a second comparison result obtained by comparing the comprehensive performance value of the first device with a comprehensive performance value of a third device, wherein the comprehensive performance value of the third device is calculated according to a performance value of the third device, and the performance value of the third device respectively indicate one or more aspects of a data exchange capability of the third device; and
setting the first device as a group server or a group client of a secondary network according to the second comparison result, wherein the secondary network comprises the first device, the second device, and the third device.

8. The method according to claim 7, wherein acquiring a second comparison result obtained by comparing the comprehensive performance value of the first device with a comprehensive performance value of a third device comprises:
receiving the performance value of the third device;
calculating the comprehensive performance value of the third device according to the received a performance value of the third device; and
comparing the comprehensive performance value of the first device with the comprehensive performance value of the third device, to obtain the second comparison result.

9. The method according to claim 7, wherein if the third device is set as the group server of the secondary network after the first device is set as the group client of the primary network and the second device is set as the group server of the primary network, and if the first device receives an invite request signal sent by the third device, the first device returns an invite response signal to the third device, wherein the invite response signal notifies the third device that the first device becomes the group client of the secondary network.

10. The method according to claim 1, wherein before acquiring a first comparison result obtained by comparing a comprehensive performance value of a device with a comprehensive performance value of a second device, the method further comprises:
setting, according to the comprehensive performance value of the second device and a comprehensive performance value of a third device, the second device as a group server of an initial network and the third device as a group client of the initial network, wherein the initial network comprises the second device and the third device, the comprehensive performance value of the third device is calculated according to a performance value of the third device, and the performance value of the third device respectively indicate one or more aspects of a data exchange capability of the third device; and if the first device is set as the group server of the primary network; and sending, by the first device, an invite signal to the third device, and receiving a response signal that is sent by the third device and specific to the invite signal, wherein the response signal notifies the first device that the third device is changed to a group client of the primary network.

11. The method according to claim 1, wherein setting the first device as a group server or a group client of a primary network according to the first comparison result comprises:

setting the group server intention value of the first device according to the first comparison result;

receiving the group server intention value of the second device, wherein the group server intention value of the second device is determined by the second device according to the first comparison result; and setting the first device as the group server or the group client of the primary network according to the group server intention value of the first device and the group server intention value of the second device.

12. The method according to claim 11, wherein setting the first device as a group server or a group client of the primary network according to the first comparison result further comprises:

sending the first comparison result to the second device.

13. The method according to claim 1, wherein calculating the comprehensive performance value of the first device according to a performance value of the first device, and calculating the comprehensive performance value of the second device according to a performance value of the second device comprises:

acquiring the comprehensive performance value of the first device by performing, according to several coefficients and by using a weighting method, weighting calculation on several performance values of the first device, and acquiring the comprehensive performance value of the second device by performing, according to the several coefficients and by using the weighting method, weighting calculation on several performance values of the second device; or enabling one performance value of the first device to be the comprehensive performance value of the first device, and enabling one performance value of the second device to be the comprehensive performance value of the second device.

14. The method according to claim 13, wherein:

the several coefficients are in a one-to-one correspondence with the several performance values of the first device, and are also in a one-to-one correspondence with the several performance values of the second device;

acquiring the comprehensive performance value of the first device by performing, according to several coefficients and by using a weighting method, weighting calculation on the several performance values of the first device comprises:

multiplying, on one-to-one basis, coefficients in the several coefficients by corresponding performance values in the several performance values of the first device, to obtain several multiplication results of the first device, and performing summation on the several multiplication results of the first device, to obtain the comprehensive performance value of the first device; and acquiring the comprehensive performance value of the second device by performing, according to the several coefficients and by using the weighting method, weighting calculation on the several performance values of the second device comprises:

multiplying, on one-to-one basis, coefficients in the several coefficients by corresponding performance values in the several performance values of the second device, to obtain several multiplication results of the second device, and performing summation on the several multiplication results of the second device, to obtain the comprehensive performance value of the second device.

15. The method according to claim 13, wherein the several coefficients are calculated by using an application analytic hierarchy process.

16. The method according to claim 1, wherein both the performance value of the first device and several performance values of the second device comprise a dominant frequency performance value of a central processing unit (CPU) and a wireless fidelity (WIFI) throughput performance value.

17. A device, comprising:

a processor; and a memory in communication with the processor, wherein the processor is configured to:

acquire a first comparison result obtained by comparing a comprehensive performance value of the device with a comprehensive performance value of a second device, wherein the comprehensive performance value of the device is calculated according to a performance value of the device, and the comprehensive performance value of the second device calculated according to a performance value of the second device, wherein the performance value of the device respectively indicate one or more aspects of a data exchange capability of the device, and the performance value of the second device respectively indicate one or more aspects of a data exchange capability of the second device; and set the device as a group server or a group client of a primary network according to the first comparison result, wherein the primary network comprises the device and the second device.

18. The device according to claim 17, wherein the several coefficients calculated by using an analytic hierarchy process.

19. The device according to claim 17, wherein both the performance value of the device and the performance value of the second device comprise a dominant frequency performance value of a central processing unit (CPU) and a wireless fidelity (WIFI) throughput performance value.

20. The device according to claim 17, wherein the setting module processor is further configured to:

before acquiring the first comparison result, set the device as an initial group client or an initial group server of the primary network according to an initial value of a group server intention value of the device and an initial value of a group server intention value of the second device, wherein the initial value of the group server intention value of the device and the initial value of the group server intention value of the second device are preset.

21. The device according to claim 17, wherein:

the processor is further configured to:

acquire a second comparison result obtained by comparing the comprehensive performance value of the device with a comprehensive performance value of a third device, wherein the comprehensive performance value of the third device is calculated according to a performance value of the third device, and the performance value of the third device respectively indicate one or more aspects of a data exchange capability of the third device; and set the device as a group server or a group client of a secondary network according to the second comparison result, wherein the secondary network comprises the device, the second device, and the third device.

22. The device according to claim 17,
wherein the processor is further configured to: after receiving an invite request signal sent by a group server of a secondary network, return an invite response signal to the group server of the secondary network, wherein the invite response signal notifies the group server of the secondary network that the device becomes a group client of the secondary network, and the secondary network comprises the device, the second device, and the third device.

23. The device according to claim 17, wherein the processor is further configured to:
if the second device and a third device already establish an initial network before the device and the second device establish the primary network, before acquiring the first comparison result, determine the second device as a group server of the initial network, wherein the initial network comprises the second device and the third device.

24. The device according to claim 23, wherein the processor is further configured to:
if the device is set as the group server of the primary network, send an invite request signal to a group client of the initial network, and receive an invite response signal that is sent by the group client of the initial network and specific to the invite request signal, wherein the invite response signal notifies the device that the group client of the initial network is changed to a group client of the primary network.

25. The device according to claim 17, wherein the processor is further configured to:
receive the performance value of the second device;
calculate the comprehensive performance value of the device and the comprehensive performance value of the second device; and
compare the comprehensive performance value of the device with the comprehensive performance value of the second device, to obtain the first comparison result.

26. The device according to claim 17, wherein:
the processor is further configured to: receive the performance value of the third device;
calculate the comprehensive performance value of the device and the comprehensive performance value of the third device; and
compare the comprehensive performance value of the device with the comprehensive performance value of the third device, to obtain the second comparison result.

27. The device according to claim 17, wherein processor is further configured to
send the performance value of the device to the second device, so that the second device calculates the comprehensive performance value of the device according to the received a performance value of the device;
receive the comprehensive performance value of the device and the comprehensive performance value of the second device, wherein the comprehensive performance value of the second device is calculated by the second device; and
compare the comprehensive performance value of the device with the comprehensive performance value of the second device, to obtain the first comparison result.

28. The device according to claim 17, wherein the processor is further configured to:
calculate the comprehensive performance value of the device;
receive the comprehensive performance value of the second device; and
compare the comprehensive performance value of the device with the comprehensive performance value of the second device, to obtain the first comparison result.

29. The device according to claim 17, wherein the processor is further configured to:
send the performance value of the device to the second device, so that the second device can calculate the comprehensive performance value of the device according to the received a performance value of the device; and
receive the first comparison result, wherein the first comparison result is obtained by the second device by comparing the comprehensive performance value of the device with the comprehensive performance value of the second device, and the comprehensive performance value of the second device is calculated by the second device.

30. The device according to claim 17, wherein the processor is further configured to:
set the group server intention value of the device according to the first comparison result;
receive the group server intention value of the second device, wherein the group server intention value of the second device is determined by the second device according to the first comparison result; and
set the device as the group server of the primary network or the group client of the primary network according to the group server intention value of the device and the group server intention value of the second device.

31. The device according to claim 30, wherein the processor is further configured to send the first comparison result to the second device.

* * * * *